D. T. OWEN.
COMBINED COUCH AND BED.
APPLICATION FILED SEPT. 24, 1907.
962,580.
Patented June 28, 1910.
4 SHEETS—SHEET 1.
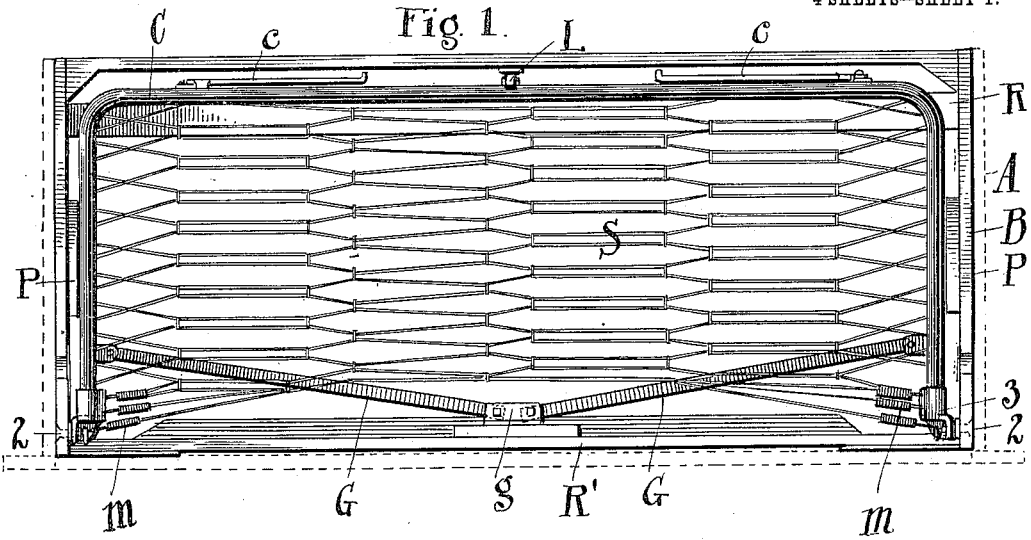
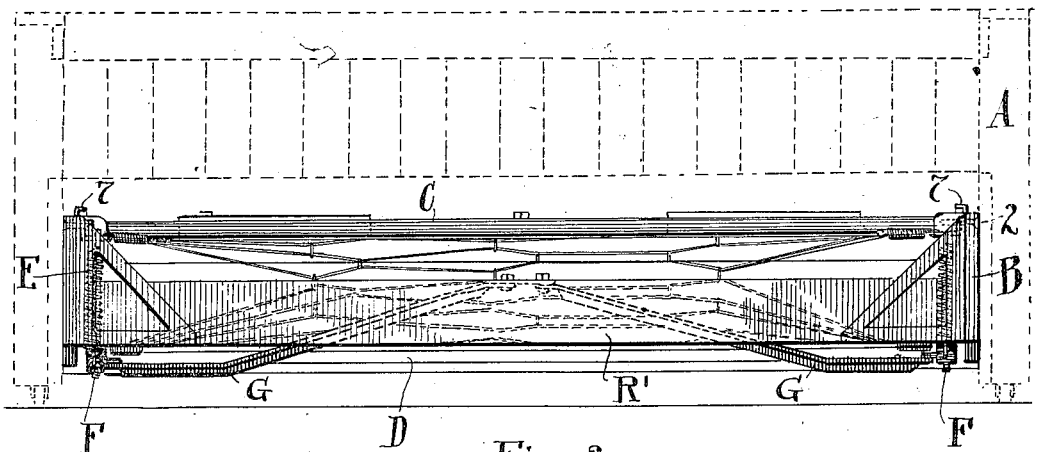
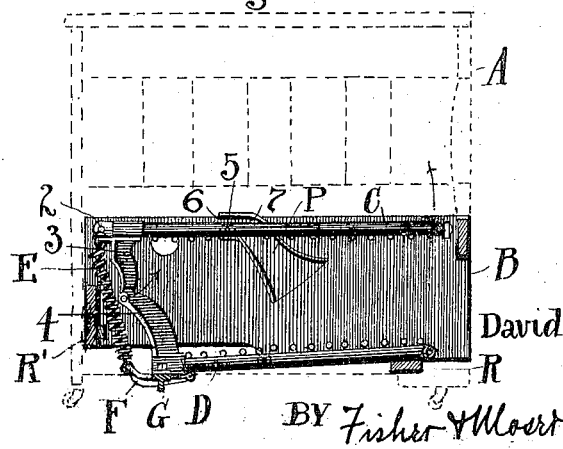
WITNESSES:
E. M. Fisher
F. C. Mussury
INVENTOR.
David T. Owen
BY Fisher & Moort ATTORNEYS

D. T. OWEN.
COMBINED COUCH AND BED.
APPLICATION FILED SEPT. 24, 1907.

962,580.

Patented June 28, 1910.
4 SHEETS—SHEET 2.

WITNESSES:
E. M. Fisher.
F. P. Mussun.

INVENTOR.
David T. Owen
BY
Fisher & Moser
ATTORNEYS

D. T. OWEN.
COMBINED COUCH AND BED.
APPLICATION FILED SEPT. 24, 1907.
962,580.
Patented June 28, 1910.
4 SHEETS—SHEET 3.
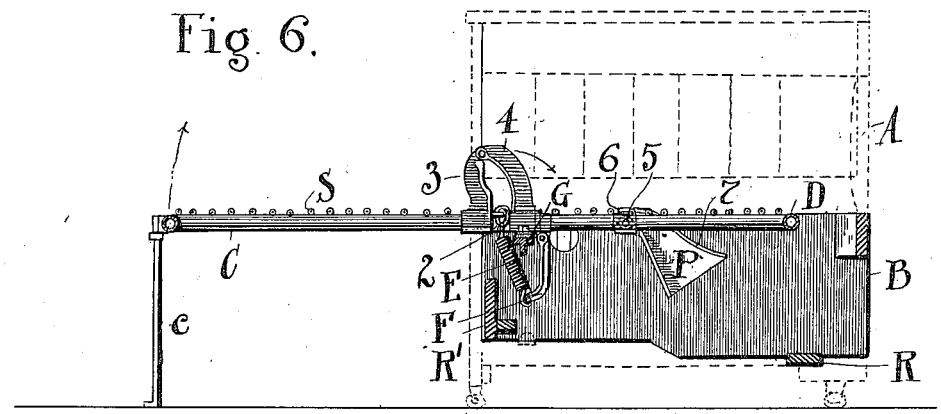
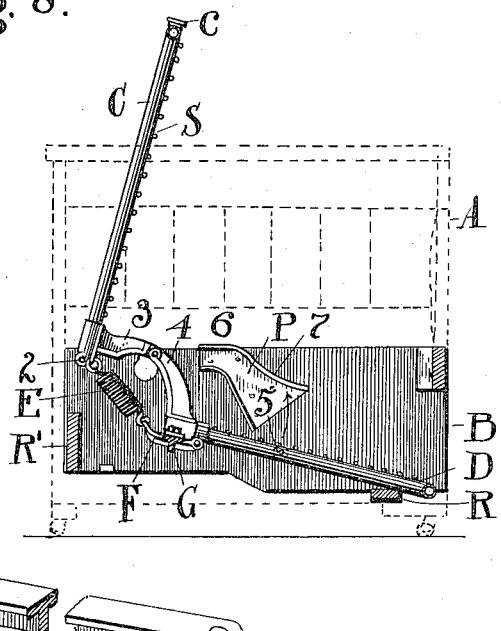
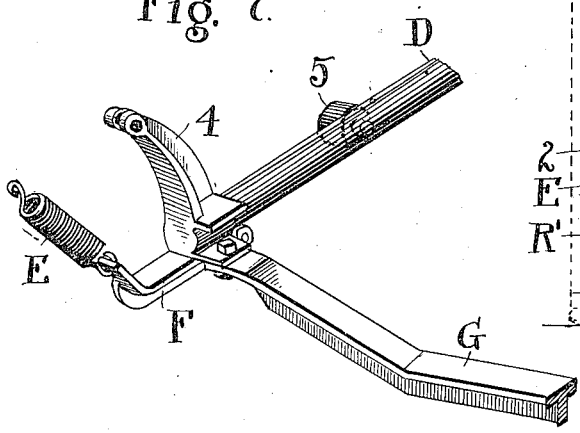
WITNESSES:
E. M. Fisher
F. C. Mussun
INVENTOR.
David T. Owen
BY
Fisher & Moser
ATTORNEYS D. T. OWEN.
COMBINED COUCH AND BED.
APPLICATION FILED SEPT. 24, 1907.
962,580.
Patented June 28, 1910.
4 SHEETS—SHEET 4.
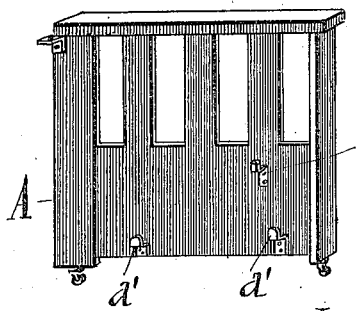
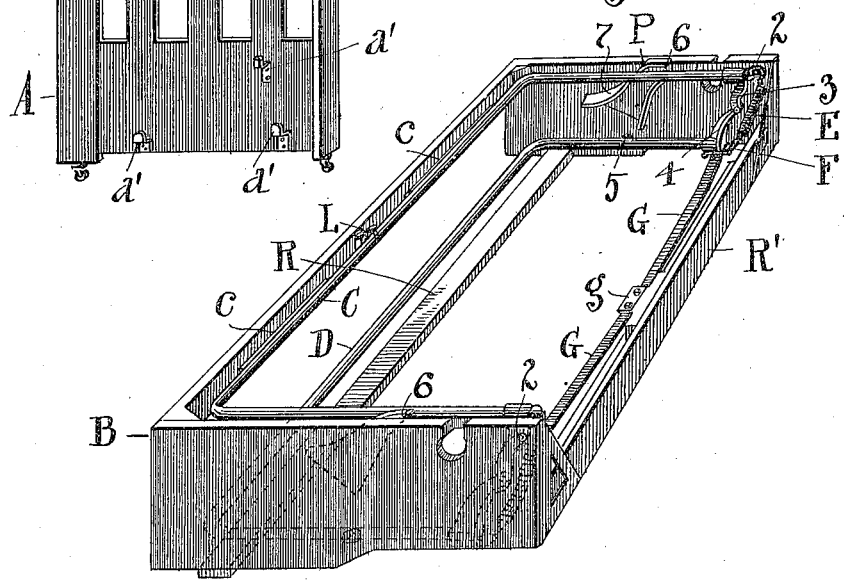
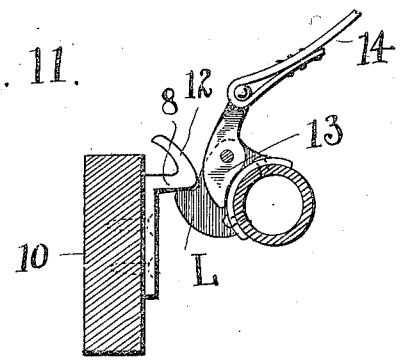
WITNESSES:
INVENTOR.
David T. Owen
BY
Fisher & Moser
ATTORNEYS

UNITED STATES PATENT OFFICE.

DAVID THOMAS OWEN, OF CLEVELAND, OHIO, ASSIGNOR TO THE D. T. OWEN COMPANY, OF EAST CLEVELAND, OHIO, A CORPORATION.

COMBINED COUCH AND BED.

962,580.

Specification of Letters Patent. Patented June 28, 1910.

Application filed September 24, 1907. Serial No. 394,409.

*To all whom it may concern:*

Be it known that I, DAVID THOMAS OWEN, a citizen of the United States, residing at Cleveland, in the county of Cuyahoga and State of Ohio, have invented certain new and useful Improvements in a Combined Couch and Bed; and I do declare that the following is a full, clear, and exact description of the invention, which will enable others skilled in the art to which it appertains to make and use the same.

My invention relates to a combined couch and bed adapted to be folded to form a couch bottom and to be unfolded to form a bed, all substantially as shown and described and particularly pointed out in the claims.

Figure 4:
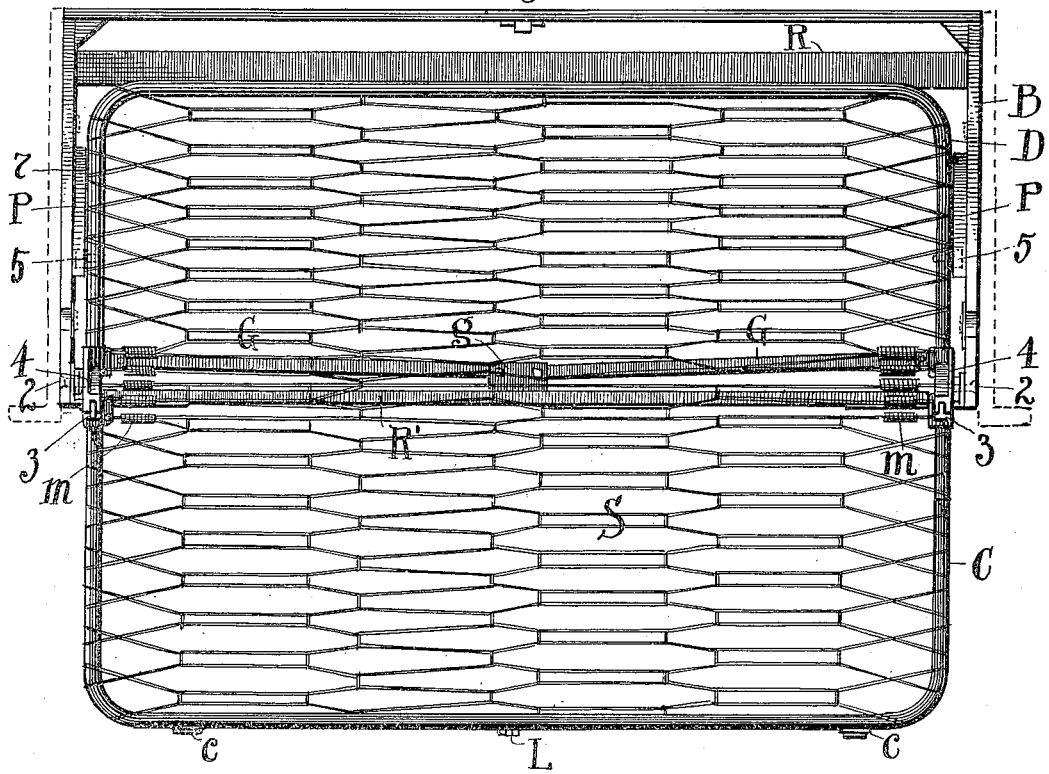
Figure 5:
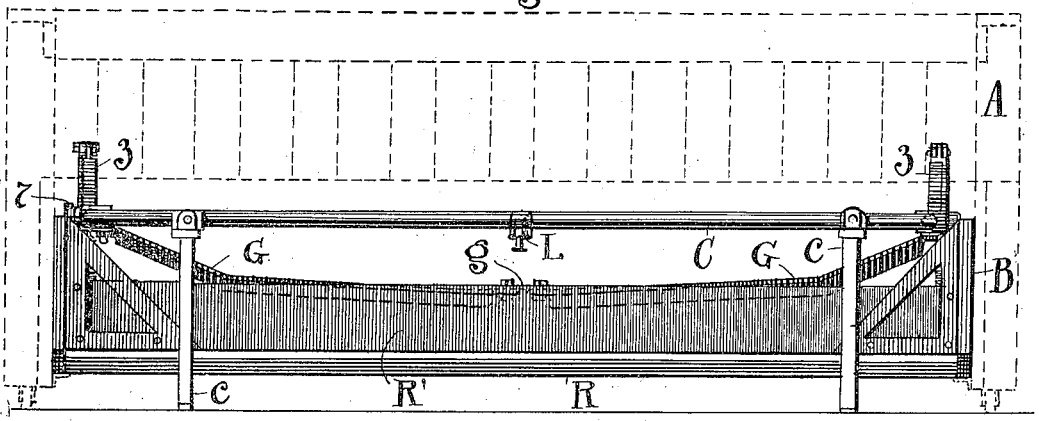

In the accompanying drawings, Figure 1 is a plan view of the invention folded. Fig. 2 is a front elevation thereof, and Fig. 3 is a cross section of Fig. 2. Fig. 4 is a plan view of the invention showing the parts open to form a bed, and Fig. 5 is a front elevation of Fig. 4. Fig. 6 is a cross section of Fig. 5, showing the operating parts at one end, and Fig. 7 is an enlarged detail of a front end portion of the rear bed frame or section and operating parts connected therewith. Fig. 8 is a cross section corresponding to Fig. 6, but with the bed sections in partially raised position. Fig. 9 is an inside elevation of one of the end supports showing means for detachably supporting the bed-box. Fig. 10 is a perspective view of the bed-box and the operative parts folded therein, and Fig. 11 is an elevation of the catch mechanism for holding down the bed frame, as hereinafter described.

As thus shown, A represents the end supports for the bed and couch box B, but instead of single end members adapted to form a knock down structure I may employ a supporting frame having box B removably supported therein on angle irons $a'$, or their equivalent.

B is a skeleton or open body or box, which serves several purposes as will hereinafter more clearly appear, but which is also an entirely separate and rigid part detachably supported at its ends on lugs or angle irons $a'$, or their equivalent on end members A, the broad idea here being the easy and convenient separation of body B from the said end supports when such separation is desirable, as well as for convenience of assembling and setting up the bed. If only end members A were used there would then be no back to the couch or seat when the bed is folded.

The mattress or bed frame proper is constituted of two separate sections C and D, front and rear, section D being adapted to remain in raised occupying position within box B, and section C to unfold at the front thereof in the same horizontal plane, and rest upon suitable legs or posts $c$ at its front edge. Otherwise said frames C and D are respectively united and supported for joint operation and use like a single continuous bed bottom, as will now clearly appear. Thus, frame C is pivoted at each end on suitably heavy pivot bolts 2 fixed in the ends of box B, on which the said frame swings into horizontal position, open or closed. When closed it constitutes the main support for the couch seat, not shown. As to this, any suitable way of sustaining frame C for the couch seat may be adopted. The said frames C and D have upright arms 3 and 4, respectively at their meeting corners, which are pivotally connected at their top, and pivots 2 constitute the fulcrums for both frames operating through said arms. Said arms are approximately of the same elevation or length, though arms 4 on rear frame D are shown as somewhat the longer, and said sets of arms at each end are operatively associated with spiral springs E, engaged at one end in the corner of frame C at or near pivot 2, and at the other upon links F which are pivotally connected with lower frame D beneath and at the corner thereof, so that said springs will, when the frames are folded, be under tension and tend to lift or open the upper frame when it is released at its latch L for this purpose. To this end links F project outward from frame D about as seen in Fig. 3, which brings springs E into such relation to arms 3 and 4 and frames C and D that when frame C is released at latch L the springs will tend to throw said arms inward at their joints as indicated by arrow Fig. 3 and raise or throw both frames at least toward position Fig. 8. In this operation rail R at the rear of box B serves as an auxiliary because frame D bears thereon and cannot drop lower under the pull of the springs, thus compelling all the yielding under each pull to come into said arms at their joint, and as upper frame C swings toward open position it carries said arms farther past dead center and facilitates the action of the springs and the opening operation. The said springs become relaxed in Fig. 8, and from that point to full position are out of service and with links F drop down out of the way of frames C and D, Fig. 6. A single or unitary woven wire mattress S overspreads both frames much as in any other double bed, except that to adopt the mattress to fold and keep it duly stretched I provide special spiral tension springs m for a few of the inner or adjacent longitudinal wires of the mattress which are attached to the respective corners of the frames in such relation that the middle of the mattress is evenly stretched with every other part when open and at the same time is adapted to fold.

In the folding operations frame D is more or less confined and guided by a roller 5 at each end near its middle adapted to enter flanged guide plates P on the inside of the ends of box or body B. Said plates have each a neck 6 at its upper front extremity flanged above and below and adapted to rest said roller therein and serve as a fixed support for frame D when the bed is open, Fig. 6. Otherwise, in the folding and unfolding of the bed, roller 5 runs beneath the upper inwardly projecting flange 7 of plate P and holds frame D to right working relations.

Frame C being pivoted at 2 on box B, is prevented from contracting endwise under pull by the wire mesh or strands of mattress S both by the rigidity of said box and front brace rail R′ beneath between the ends of the box, but frame D having no such bracing connections is braced endwise by braces G, horizontally pivoted on bracket g centrally on the front R′ of box B. Said braces G swing with the ends of frame D on their pivots within limits and are comparatively loose in said pivots to enable such movements to take place.

In the present construction frame C is held down in closed position, as in Fig. 10, by its latch L engaging beneath catch 8 on rear rail 10 of box B. Said latch is fixed rigidly on frame C and has a curved or cam shaped under surface adapted to run down on reversely curved extension 12 on catch 8 and, by utilizing the natural spring of wooden bar or rail 10, crowd down past said extension into engaging position beneath with said catch. Then to release the catch I employ cam lever 13 which is pivoted on one side of latch L and provided with a handle and strap 14 or equivalent means to draw said cam against catch 8 and thereby release latch L by pressing the catch outward. When the bed is open it has three points of fixed rest including front legs c, pivots 2 and rollers 5, and thus both frames C and D are practically rigid, and frame D participates in supports 2 through rigid connecting posts 3 and 4. The end members A′ are of course designed to be artistically finished and belong practically to the cabinet maker's art, while skeleton box B may be in the rough and serves merely as a rigid frame for mounting the operative parts of the bed and couch, upper bed frame or part C serving in any event as a spring for the couch seat. Said end members may therefore be more or less elaborate according to style and value wanted. Whether the frames C and D be regarded as separate frames or parts operatively united or as separate portions or sections of what may be termed a single frame, is immaterial. From either point of view, they are the same.

It will be noticed that endwise braces G for the rear bed frame or section are bent upward at their ends to come into the working plane of said frame and their free pivots at g afford all needed rocking movement. When the bed sections C and D are folded within box B, section D is lowered to a plane sufficiently below section C to confine and store up the bedding between said parts, and when said sections are unfolded the bedding is also unfolded and the finishing or upholstering (not shown) which forms the seat of the couch is either removed initially or caused to drop away from section C and its spring bottom S when said section is inverted.

What I claim is:—

1. In a combined bed and couch, a foldable bed frame and an open-work inclosing frame connected therewith within which said bed frame may be folded and unfolded and bodily transported without detaching the same, and couch frame ends having angle members on which said open-work frame is removably mounted.

2. A combined bed and couch comprising a skeleton frame and foldable bed and couch mechanism pivotally connected therewith and movably supported therein, and said frame and mechanism having fixed working relations to permit joint movability without separating the said parts, in combination with couch frame ends provided with angle members on their inside to removably seat said skeleton frame thereon.

3. In a combined bed and couch, a two section foldable bed frame comprising sections provided with rigid pivotally connected arms at their ends and a foldable spring and link connection for said frames beneath said arms adapted to raise the front section, a skeleton inclosing frame having fixed pivot and supporting connections for said bed frame, and couch frame arm ends detachably connected with said skeleton frame.

4. In a combined bed and couch, a two section bed frame provided with projecting arms hinged together at their extremities, and one of said sections having pivot supparts therefor, and springs and links therefor mounted altogether on said bed frame and connecting said two sections across the open joint between said hinged arms to provide an initial lift for the upper section.

5. In a combined bed and couch, a sectional bed frame and a support on which said frame is pivoted, pivotally connected arms on the meeting ends of said bed sections adapting said ends to separate and a foldable and unfoldable spring connection uniting and spanning said meeting ends between their separable portions to assist in unfolding the said sections when folded one upon the other.

6. In a combined bed and couch, a bed frame comprising two bed sections pivotally connected for joint movement and a support on which the front section is pivoted, rigid links pivotally connected to the rear section and contracting springs connecting said links with the front section.

7. In a combined bed and couch, a supporting frame and a pair of bed sections hinged together and one of said sections pivotally mounted at the front of said frame and whereby both sections may be jointly actuated, and braces for the other of said sections pivotally engaged therewith and with said supporting frame between the ends thereof.

8. In a combined bed and couch, a supporting frame having a front piece, in combination with two bed sections hinged together and one of said sections pivotally mounted at the front of said frame and adapted to lift the other section when unfolded, and a set of braces rotatably secured to said front piece and to the front corners of the rear bed section.

9. In a combined bed and couch, a supporting frame and a folding bed frame in two sections pivotally mounted therein, in combination with springs uniting the corners of said sections and adapted to throw the outer frame upward to opening position, and pivotally mounted endwise braces engaged with the front corners of the inner of said frames and with said supporting frame.

10. In a combined bed and couch, a box frame and a bed frame in two sections having a spring bottom stretched therein and provided with pivotally connected uprights at their ends, and one of said sections pivotally secured to said frame, and the other of said sections having swinging brace members connected therewith at said uprights and with said box frame, and supporting guides for said rear section on the ends of said box frame.

11. In a combined bed and couch, a supporting frame and a sectional bed frame in two parts having projecting arms hinged together and one of said sections pivotally secured to said supporting frame at its front, and said supporting frame having a front cross piece adapted to brace the pivotally mounted section between its pivots, in combination with means to brace the other section between its hinged arms, and a spring bottom stretched within and upon said bed frame parts.

12. In a combined bed and couch, a supporting box and a sectional folding bed frame in two sections pivoted in the ends thereof, guides on the ends of said box and end projections on the rear of said frame adapted to rest in said guides, and endwise braces for the rear section of the bed frame pivotally supported at one end on said box.

13. In a combined bed and couch, a supporting inclosure having a front cross piece adapted to provide a fixed brace, a sectional folding bed frame pivotally secured to said supporting inclosure at the front thereof, a spring bottom for said sectional bed frame, spring connections between the sections of said bed-frame, and means supplemental to said front cross piece to brace said sectional bed frame between its ends at its pivots, said means constructed to permit free folding and unfolding of said bed frame.

14. A combined bed and couch comprising a supporting frame and a sectional bed frame pivoted therein and having a single continuous wire mattress extending from front to rear thereof, and a pair of oppositely extending braces engaging the front corners of the rear section of said bed frame and pivotally engaged with said supporting frame.

15. In a combined bed and couch, an open supporting frame and a two section folding bed frame mounted therein by pivotal supports at its front, and means to foldably unite said sections comprising hinged connecting parts thereon, fixed guide supports and pivoted endwise braces for one of said bed sections, legs for the other section, a spring bottom for both bed-frame sections, and contracting springs connecting said sections adapted to facilitate unfoldment thereof.

16. In a combined bed and couch, a supporting frame and a folding sectional bed bottom pivotally united and rotatably supported thereon, and separate bracing means for each bed bottom section between the respective pivotal and rotatable connections thereof.

17. In a combined bed and couch, a rigid open skeleton frame having bed bottom supporting members and a sectional bed bottom pivotally mounted thereon and constructed to fold and unfold, said skeleton frame constituting a support and inclosure to permit said parts to be handled and transported jointly, spring connections adapted to fold and unfold and mounted upon and connecting said sections to unfold the same, and a locking device mounted upon one of said sections and adapted to engage said rigid frame, in combination with couch frame ends and means to detachably secure said ends to said skeleton frame.

18. In a folding bed, a support and a two-part bed bottom hinged to fold and unfold, and means comprising coiled springs and hinged links connecting the separable meeting ends of said bed bottom parts to unfold the same and constructed to fold and unfold during part of the bed folding operations.

19. A knockdown bed and couch comprising a skeleton frame of rectangular form having braced end portions, and a foldable sectional bed frame pivotally secured within said skeleton frame between the braced ends thereof and bodily movable therewith for shipment and assembling, in combination with couch ends and means to detachably support said skeleton frame and said bed frame between and upon said ends.

20. In a knock-down couch and bed, a folding bed-frame and a bracing and supporting skeleton frame therefor having fixed working attachment therewith to permit joint movability and shipment of said frames, in combination with separate couch ends having detachable connections with said skeleton ends.

21. In a knock-down bed and couch, a rigidly braced skeleton frame having a sectional bed frame foldably mounted therein and fixed thereto between its ends and braced thereby against strains in use, shipment and assembling, in combination with separate couch ends removably engaged with said skeleton frame.

In testimony whereof I sign this specification in the presence of two witnesses.

DAVID THOMAS OWEN.

Witnesses:
 R. B. MOSER,
 E. M. FISHER.